Patented Oct. 30, 1928.

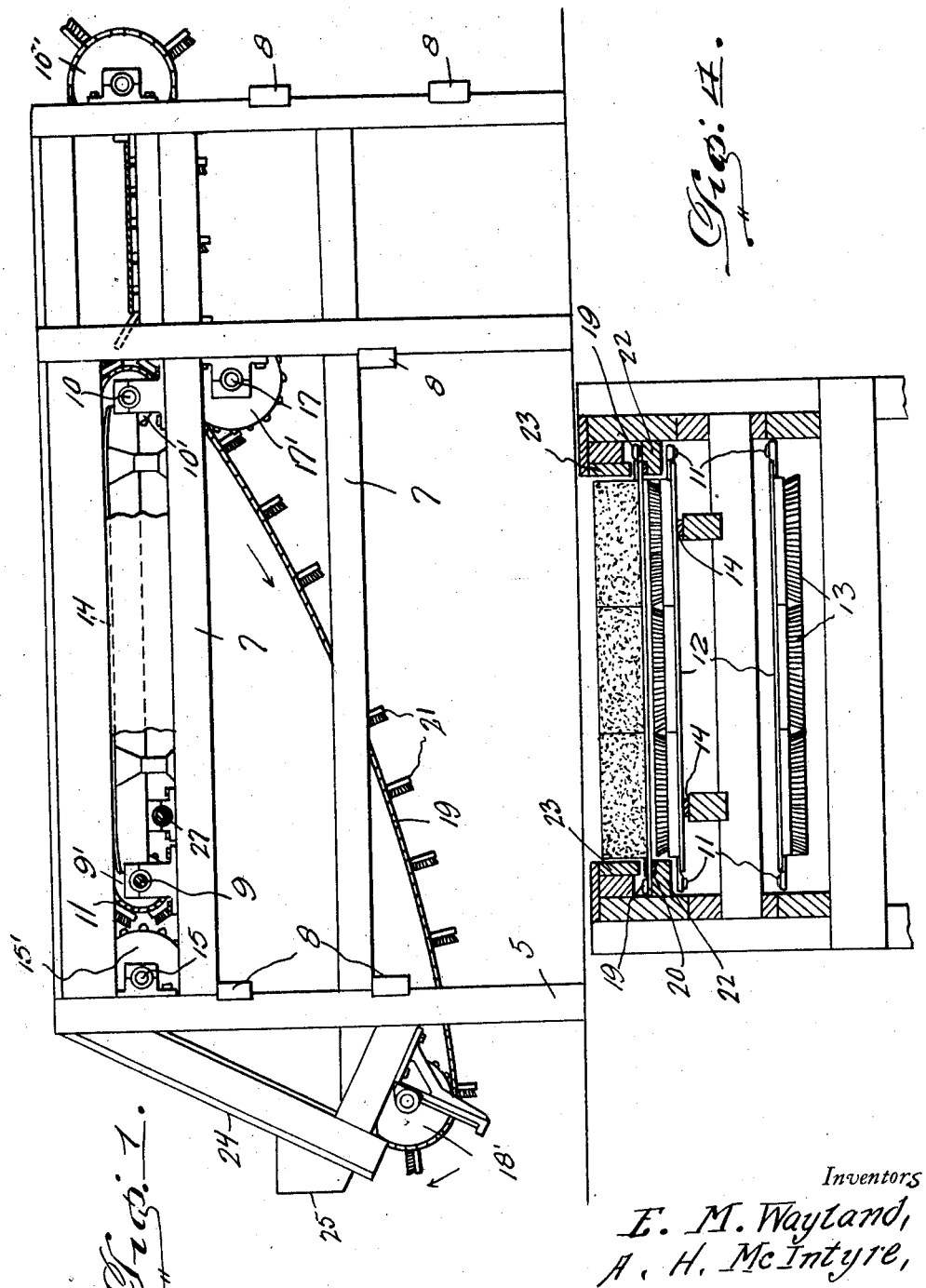

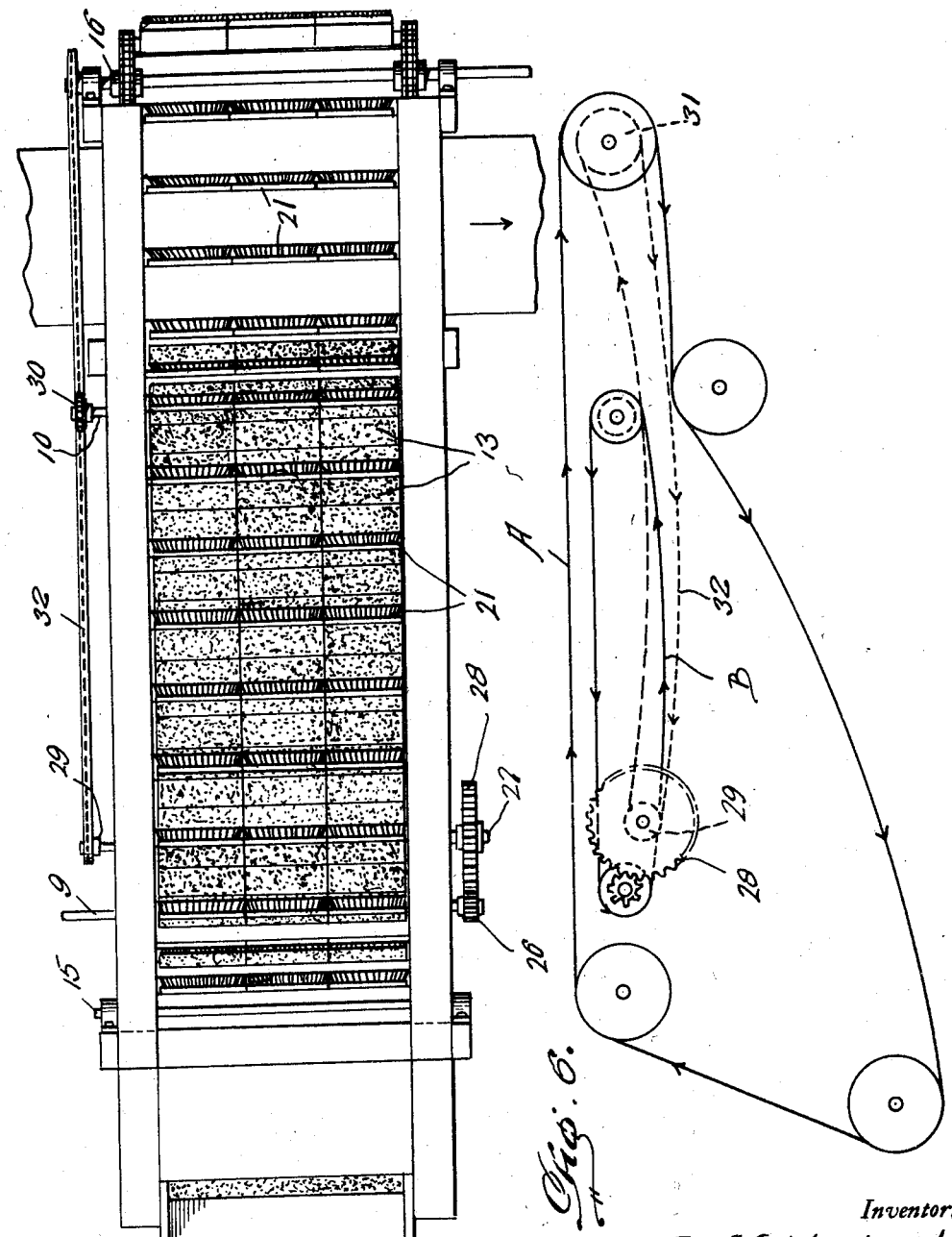

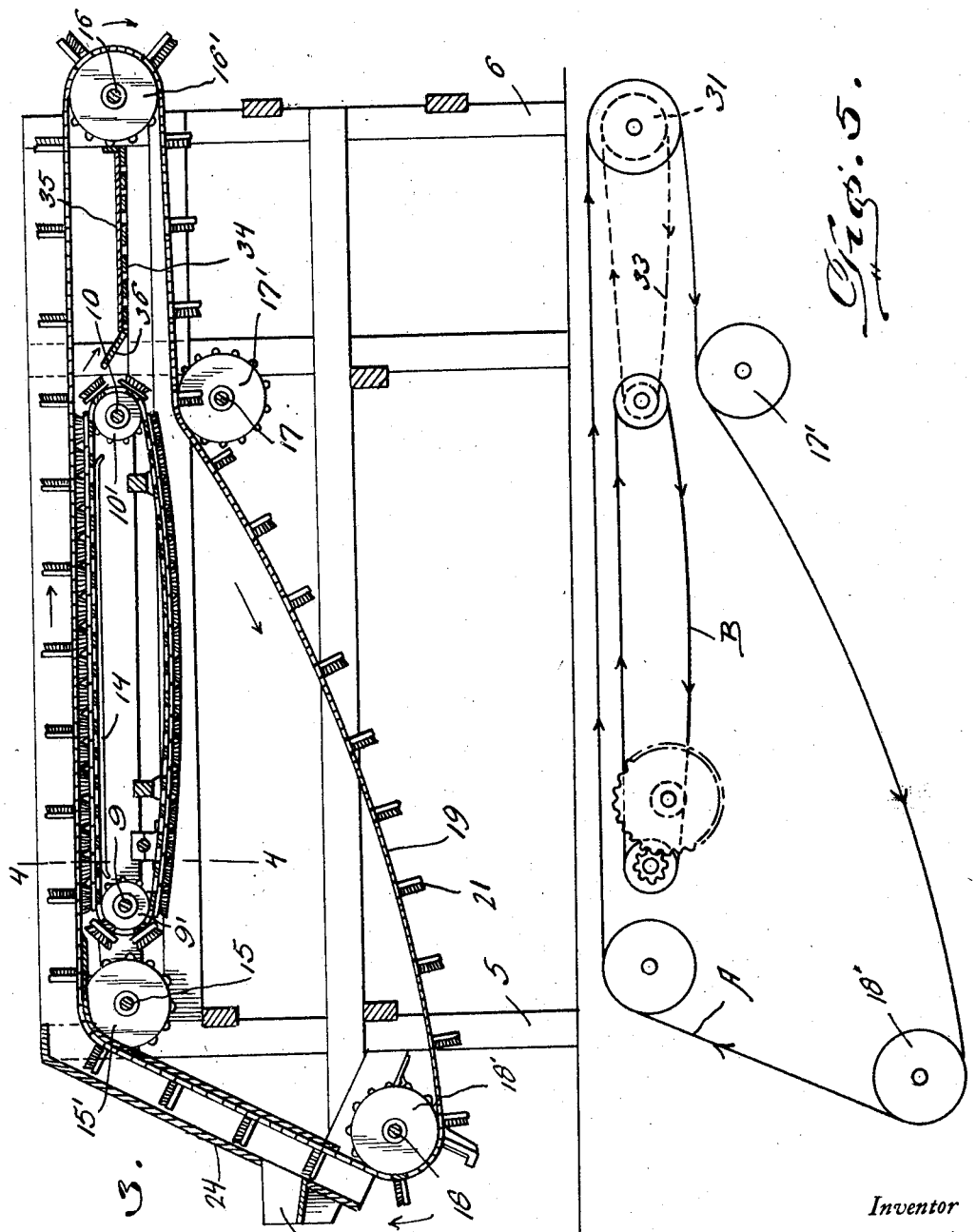

1,689,653

UNITED STATES PATENT OFFICE.

EDWIN M. WAYLAND AND ALLAN H. McINTYRE, OF COVESVILLE, VIRGINIA.

FRUIT CLEANING AND POLISHING MACHINE.

Application filed May 14, 1927. Serial No. 191,418.

This invention relates to new and useful improvements in machines for cleaning and polishing fruit, vegetables, and the like, and aims to provide a highly efficient and yet simply constructed mechanism whereby the entire surfaces of the fruit and vegetables are thoroughly cleaned and polished without any liability of scratching or bruising the same.

In carrying out our invention there is provided generally a horizontally extending endless series of cleaning and polishing brushes over which the articles are conveyed, the conveying means consisting of an endless series of spaced brushes which not only provide conveyor flights but also acts as means against which the articles being cleaned will rest so that these brushes will cooperate with the first mentioned brushes to thoroughly clean the entire area of the fruit or vegetables.

Further, the conveying means is so arranged as to provide a delivery unit for the articles from a hopper adjacent the floor level to a position upon the horizontal series of brushes which are arranged in close relation to properly support the article while being conveyed thereover.

The invention further aims to provide a machine wherein the mechanism is such as to permit the horizontal endless series of brushes to be moved in a forward or rearward direction dependent upon the extent of the cleaning and polishing necessary.

A further advantage in the use of the machine of this character, is that the fruit or vegetables are forced through the machine at a uniform rate, determined as desired, by sprocket or drive ratios used. This is very important when cleaning such shapes of vegetables as cucumbers or sweet potatoes, which usually clog in polishers that depend on rolling action of the fruit or vegetables being cleaned, to get it through the machine.

Again, by change of sprocket or drive ratio quickly effected, dirty fruit or vegetables may be kept under polishing action longer while practically clean fruit may be let through the machine in a more rapid manner as certain changes may require.

To the best of our knowledge, there is no other machine in this particular art that carries this particular advantage.

Again, when the two sets of brushes are traveling in opposite directions, we get for our relative brush speed on the surface to be cleaned, the sum of the motions, not the difference.

In one of the most popular polishers now in use, this relative brush speed is actually zero, the fruit and vegetables only spinning on brushes all revolving in the same direction with the periphery of the fruit. We have knowledge of machines wherein the brush motions are not the same, but we have no knowledge of any machine where they are directly opposed.

The reverse motion in this particular character of machine means that loss of fruit periphery speed, relative to one brush necessarily means increased proportional speed, relative to the other brush, so that positive brushing action is assured.

Our experiments show that apples and similar fruit divide the polishing effect between the two sets of brushes. We know of no other polisher employing this positive action.

In some cases, notably in the cleaning and polishing of peaches, certain varieties need thorough polishing, while other varieties do not require polishing. In peach packing houses, it is customary to move the polisher in or out of position in the sequence of machines to accomplish this end, which is an awkward and expensive procedure.

We obviate this difficulty by providing means whereby the inner brushes may be driven in the same direction and at the same speed as the outer brushes by a simple change in transmission connections, readily made that convert the polisher into a non-polishing elevator and conveyor, that need not be moved or by-passed when the polishing is not to be done.

Briefly, our machine permits any desired combination of both positive and relative brush speed with reverse or one way motion, thus affording various degrees of thoroughness of polishing or non-polishing operation.

In the drawings:—

Figure 1 is a side elevation of the preferred embodiment of our improved machine.

Fig. 2 is a top plan view thereof.

Fig. 3 is a detail longitudinal section of the machine.

Fig. 4 is an enlarged detail transverse section, taken substantially upon the line 4—4 of Fig. 3, looking toward the left, and certain structural features unnecessary to this illustration being omitted.

Fig. 5 is a diagrammatic side elevation of the movable elements of the mechanism disclosing the endless brushing and polishing unit as moving in the same direction, and Fig. 6 is a similar view disclosing a drive between the units to cause the reversal of movement thereof for a purpose previously set out.

Now having particular reference to the drawings, our novel machine consists of a substantially rectangular shaped frame consisting of vertical end posts 5—5 and 6—6, suitably braced by longitudinally and transversely extending bars 7 and 8 respectively, preferably in the arrangement as suggested in the drawings.

However, at this point it may be well to state that we do not desire to be limited to any particular frame construction as the same may be changed at will without in any manner whatever affecting the spirit and scope of the appended claims.

As a matter of fact, we only make claim to the structural association and arrangement of the movable units of the device and these may be supported in any character of frame desired.

Arranged transversely within this character of frame is a pair of longitudinally spaced rotating shafts 9 and 10, the shaft 10 being spaced inwardly of the vertical frame bars 6—6, as clearly disclosed in Figs. 1 and 3. These shafts 9 and 10 are suitably journaled within bearings as suggested in Fig. 1, while within these bearings the ends of the shafts are equipped with sprocket gears 9'—9', and 10'—10'. As disclosed in Figs. 2, 3 and 4, the top side of the frame is entirely open, and said shafts 9 and 10 are arranged slightly beneath this open side.

Trained around the sprocket gears of these shafts 9 and 10, are sprocket chains 11—11, that are interconnected by spaced transversely extending slats 12 to the top sides of which are rigidly connected the backings of brushes 13, the ends of these brushes being arranged in close contact while the width of the brushes are such that the bristles of those upon one slat 12 will engage the bristles of those of the next adjacent slat to provide a closed endless belt, throughout the area between the shafts 9 and 10.

The upper run of this endless brush carrying unit or belt is supported in horizontal non-sagging position by reason of a pair of longitudinally extending supporting rails 14—14 rigidly attached to the machine frame in a manner as suggested in Figs. 1, 3 and 4.

Arranged transversely within the machine frame at the opposite ends thereof, and in true longitudinal spaced relation with the shafts 9 and 10, are other shafts 15 and 16, equipped adjacent their ends with large sprocket gears 15'—15' and 16'—16' respectively. Journaled transversely within the machine frame, beneath and slightly in back of the previously mentioned shaft 10 is a shaft 17 equipped at its opposite ends with large sprocket gears 17'—17', see Figs. 1 and 3.

At the forward end of the machine frame, outwardly of the vertical standards 5—5 and adjacent the lower ends thereof, is a transverse shaft 18 also equipped at its ends with large sprockets 18'—18'. Trained over the gears 15'—15', 16'—16', 17'—17' and 18'—18', are endless chains 19—19, which constitute the belt and are connected thru transversely extending longitudinally spaced slats 20, upon the outer faces of which are arranged outwardly extended brushes 21 that provide conveyor flights.

As clearly indicated in Fig. 4, the ends of the chain connecting slats 20 between the shafts 15 and 16 are supported by horizontal guide rails 22—22. As further indicated in said Fig. 4, the ends of the flight producing brushes associated with each chain connecting slat 20, terminate within the ends of the slat and are guided between other rails 23—23 at the top of the frame structure upon the inner faces of the sides thereof, said rails further preventing the movement of the fruit or vegetables beyond the ends of said flight producing brushes.

At the forward end of the machine frame, between the shafts 15 and 18, is an upwardly extending inclined trunk 24 that is equipped adjacent its lower end with a fruit or vegetable hopper 25, the upper end of this trunk opening at the point directly above the sprocket gears 15'—15' of the adjacent transverse shaft 15, and through which trough travels the outer brush conveyor mechanism, see Fig. 3.

The ends of the shaft 9 extend beyond the sides of the machine frame, while one end thereof is equipped with a small spur gear 26. The opposite end of this shaft may be equipped with a belt pulley so that power from a suitable power plant may be imparted thereto. Extending transversely through the machine frame forwardly and slightly below the shaft 9 is a shaft 27 equipped at its end adjacent the gear 26 of the shaft 9, with a large spur gear 28 that has mesh with said gear 26. The opposite end of this shaft 27 is equipped with a small sprocket gear 29 while the adjacent ends of the shafts 10 and 16 extend beyond the side of the machine frame and are equipped with sprocket gears 30 and 31 of a predetermined ratio, the gear 30 being preferably larger than the gear 29 while the gear 31 is preferably still larger than the gear 30, see the diagrammatic views, Figs. 5 and 6.

When it is desired to cause the travel of the brush conveyors in reverse directions, as indicated by the arrows in Fig. 6, an endless sprocket chain 32 is trained over the sprocket gears 29 and 31 of the shafts 27 and 16 respectively. By turning shaft 9 in a counterclockwise direction, or by turning shaft 16 in a clockwise direction, the outer endless brush conveyor designated in the diagrammatic view, Figure 6, by the reference character A, is caused to move forwardly in the direction of the arrows, while the inner brush conveyor designated in said view by the reference character B, is caused to travel reversely as also indicated by the arrows.

However, when it is desired to move the inner brush conveyor B in a direction similar to the direction of movement of the conveyor A, Figure 5, the elongated chain 32 is dispensed with and in its stead, there is trained over the gears 30 and 31, a shorter endless chain 33 and in this instance, the shaft 27 becomes an idler shaft. Power may then be applied to either the shaft 9 or 16, in a clockwise direction, resulting in the movement of the conveyors as indicated by the arrows in Fig. 5.

In order that the respective speeds of the endless brush conveyors may be varied to meet the desired conditions, it is only necessary to equip the various operating shafts with different sized sprocket gears, and this without necessitating the entire or even partial dismantling of the machine as none of the essential structural elements need be removed or even tampered with.

Arranged transversely within the frame between the shafts 10 and 16 is a suitable decking 34 over which is an endless conveyor belt 35 that has communication with the usual sizing apparati employed in packing houses so that the fruit or vegetables dropping from the innermost brush conveyor will be passed thereto. For guiding the articles from the innermost brush conveyor 35, there is provided a transversely extending inclined chute 36 suitably arranged within the machine frame.

Obviously when the endless conveyors are operated in reverse directions as indicated by the diagrammatic view in Fig. 6, the fruit or vegetables within the hopper 25 are delivered to the top of the machine, by the brushes moving through the trough 24. As soon as the fruit or vegetables reach the upper flight of the inner horizontal conveyor, the brushes thereof will force the fruit into engagement with the brushes 21 of the outer conveyor and the combined brushes of the two conveyors will result in the cleaning and polishing of the fruit or vegetables throughout the entire surface, due to the fact that the articles are forced to rotate while undergoing such movement. However, the device may be employed as a machine for conveying the articles from the hopper 25 to the conveyor belt 35 by moving the inner and outer brush units in a direction towards said conveyor with the result that the articles may be passed through the usual mechanism within a packing house without requiring the removal of this or any other apparatus, which is necessary in the polishing and cleaning machine, with which we are familiar when it is not desired to clean or polish the fruit or vegetables.

Moreover, when the conveyor units are both operated in this similar direction, the outer conveyor may be actuated at a speed greater than the inner conveyor for causing cleaning or polishing operation to a minimum degree. Furthermore, by operating the outer unit in the direction of the arrows in Fig. 1, the inner conveyor unit may be maintained stationary resulting in a proportionate cleaning and polishing operation.

In view of the foregoing description, when taken in conjunction with the accompanying drawings, it is believed by us, that the material structural units of this machine, as well as the operation thereof will be readily apparent to those skilled in the art, and even though we have herein shown and described the invention as consisting of certain detail structural elements, it is nevertheless to be understood that we by no means desire to be limited to such, as in the future practice of the invention, such changes and departures may be had that will not affect the spirit and scope of the following claims.

Having thus described our invention, what we claim as new is:—

1. In a fruit or vegetable cleaner, and in combination, a belt having a brush surface, and a second belt having transverse spaced combined flights and brushes, said belts also having runs in substantial parallelism, and the faces of the combined flights and brushes of the second named belts in the said run thereof being disposed angularly to and above the brush surface in said run of the first named belt and exposed to and adapted to contact with fruits or vegetables supported on said surface.

2. In a fruit or vegetable cleaner, and in combination, a belt having a brush surface, a second belt having transverse spaced combined flights and brushes, said belts also having runs in substantial parallelism, and the faces of the combined flights and brushes of the second named belt in the said run thereof being disposed angularly to and above the brush surface in the said run of the first named belt and exposed to and adapted to contact with fruits or vegetables supported on said surface, a trunk receiving a portion of the second named belt and arranged at one end of said runs of the belts, and means for delivering fruits or vegetables to said trunk.

3. In a fruit or vegetable cleaner, and in combination, a belt having a brush surface, a second belt having transverse spaced combined flights and brushes, said belts also having runs in substantial parallelism, and the faces of the combined flights and brushes of the second named belts in the said run thereof being disposed angularly to and above the brush surface in said run of the first named belt and exposed to and adapted to contact with fruits or vegetables supported on said surface, a trunk receiving a portion of the second named belt and arranged at one end of said runs of the belts, means for delivering fruits or vegetables to said trunk, and a conveyor arranged to receive fruits or vegetables from the opposite end of the said run of the first named belt.

4. In a fruit or vegetable cleaner, and in combination, a belt having a brush surface, a second belt having transverse spaced combined flights and brushes, said belts also having runs in substantial parallelism, and the faces of the combined flights and brushes of the second named belt in the said run thereof being disposed angularly to and above the brush surface in said run of the first named belt, and opposed to and adapted to contact with fruits or vegetables supported on said surface, and means for driving said belts.

In testimony whereof we affix our signatures.

EDWIN M. WAYLAND.
ALLAN H. McINTYRE.